US012746885B1

(12) United States Patent
Ledford et al.

(10) Patent No.: US 12,746,885 B1
(45) Date of Patent: Sep. 29, 2026

(54) PASSENGER AIRBAG SYSTEM ASSEMBLY

(71) Applicant: GM Global Technology Operations LLC, Detroit, MI (US)

(72) Inventors: Derrick James Ledford, Chesterfield, MI (US); Jeffrey Todd Kinser, Lake Orion, MI (US); Kenneth M. Zawisa, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 19/293,884

(22) Filed: Aug. 7, 2025

(51) Int. Cl.
*B60R 21/205* (2011.01)
*B60R 21/215* (2011.01)

(52) U.S. Cl.
CPC .......... *B60R 21/205* (2013.01); *B60R 21/215* (2013.01); *B60R 2021/21512* (2013.01)

(58) Field of Classification Search
CPC .................................................... B60R 21/205
See application file for complete search history.

(56) References Cited

U.S. PATENT DOCUMENTS 5,135,252 A * 8/1992 Suran .................... B60R 21/205 280/732
5,145,207 A * 9/1992 Bederka ................ B60R 21/205 280/732
5,474,323 A * 12/1995 Davidson ............ B60R 21/2171 280/728.2
5,489,116 A * 2/1996 Boag ..................... B60R 21/205 280/732
5,799,970 A * 9/1998 Enders ................ B60R 21/2171 280/730.2
6,161,865 A * 12/2000 Rose ................... B60R 21/2171 280/732
6,406,056 B2 * 6/2002 Yokota .................. B60R 21/205 280/732
6,481,742 B2 * 11/2002 Usami ................. B60R 21/2171 280/736
12,330,578 B1 * 6/2025 Rutelin ................. B60R 21/205
2013/0076010 A1 * 3/2013 Yoshimura ............ B60R 21/217 280/728.2
2015/0033531 A1 * 2/2015 Kaphengst ............ B60R 21/205 29/721

FOREIGN PATENT DOCUMENTS

| | | | | |
|---|---|---|---|---|
| BR | 102015009910 A2 * | 12/2015 | ........... B60R 21/205 |
| DE | 102015122326 A1 * | 6/2016 | ........... B60R 21/215 |
| DE | 102022107128 A1 * | 9/2022 | |
| DE | 102022125270 A1 * | 4/2023 | ........... B60R 21/217 |
| GB | 2427598 B * | 6/2007 | ............. B60R 21/20 |
| JP | 4015533 B2 * | 11/2007 | |
| JP | 4042662 B2 * | 2/2008 | |
| JP | 4617766 B2 * | 1/2011 | |
| WO | WO-2007061822 A2 * | 5/2007 | ........... B60R 21/217 |
| WO | WO-2010091819 A1 * | 8/2010 | ........... B60R 21/205 |

* cited by examiner

*Primary Examiner* — Nicole T Verley
(74) *Attorney, Agent, or Firm* — Honigman LLP; Matthew H. Szalach

(57) ABSTRACT

An airbag system assembly is provided and includes a housing including a housing perimeter wall, an airbag chute coupled to the housing perimeter wall to define an airbag chamber between the housing and the airbag chute, and a bracket coupled to the airbag chute and including at least one fastener for securing the airbag chute the housing.

20 Claims, 5 Drawing Sheets

PASSENGER AIRBAG SYSTEM ASSEMBLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicles and, more particularly, to a passenger restraint system.

Passenger airbag systems are designed to protect occupants during collisions. These systems use sensors to detect the presence, weight, and position of a passenger, ensuring the airbag deploys only when necessary and with appropriate force. Upon impact, the airbag inflates rapidly to cushion the passenger, preventing contact with the dashboard or windshield. While airbag systems have operated for their intended purpose, further development is needed to address evolving vehicle designs and occupant needs.

SUMMARY

In one configuration, an airbag system assembly is provided and includes a housing including a housing perimeter wall, an airbag chute coupled to the housing perimeter wall to define an airbag chamber between the housing and the airbag chute, and a bracket coupled to the airbag chute and including at least one fastener for securing the airbag chute to the housing.

The airbag system assembly may include one or more of the following optional aspects. For example, the airbag chute can include a chute perimeter wall that engages the housing perimeter wall. The chute perimeter wall can include one or more windows extending through the chute perimeter wall. The housing can include one or more tabs coupled to the housing perimeter wall and can be disposed to correspond with the windows of the chute perimeter wall.

According to at least one aspect, the bracket can include one or more supports engaging the housing perimeter wall. The one or more supports can include a hook engaging a distal end of the chute perimeter wall and an arm engaging the housing perimeter wall.

According to another aspect, the airbag chute can include a first flange extending from the chute perimeter wall and a second flange disposed on an opposite end of the airbag chute and extending from the chute perimeter wall. The bracket can include a first half engaging the first flange and the second flange and a second half engaging the first flange and the second flange. The at least one fastener can include a first fastener coupling together the first flange, the first half, and the second half and a second fastener coupling together the second flange, the first half, and the second half.

According to at least one example, the airbag chute includes at least one joint extending through the chute perimeter wall.

In another configuration, a vehicle is provided and includes a vehicle body including a first end and a second end spaced from the first end in a fore-aft direction, a first side and a second side spaced from the first side in a cross-car direction, a vehicle interior, and a vehicle exterior. The vehicle further includes an instrument panel disposed within the vehicle interior and extending in the cross-car direction between the first side and the second side and an airbag system assembly coupled to the instrument panel. The airbag system assembly includes a housing including a housing perimeter wall, an airbag chute coupled to the housing perimeter wall to define an airbag chamber between the housing and the airbag chute, and a bracket coupled to the airbag chute and including at least one fastener for securing the airbag chute the housing.

The vehicle may include one or more of the following optional aspects. For example, the airbag chute can include a chute perimeter wall that engages the housing perimeter wall. The chute perimeter wall can include one or more windows extending through the chute perimeter wall. The housing can include one or more tabs coupled to the housing perimeter wall and can be disposed to correspond with the windows of the chute perimeter wall.

According to at least one aspect, the bracket can include one or more supports engaging the housing perimeter wall. The one or more supports can include a hook engaging a distal end of the chute perimeter wall and an arm engaging the housing perimeter wall.

According to another aspect, the airbag chute can include a first flange extending from the chute perimeter wall and a second flange disposed on an opposite end of the airbag chute and extending from the chute perimeter wall. The bracket can include a first half engaging the first flange and the second flange and a second half engaging the first flange and the second flange. The at least one fastener can include a first fastener coupling together the first flange, the first half, and the second half and a second fastener coupling together the second flange, the first half, and the second half.

According to at least one example, the airbag chute includes at least one joint extending through the chute perimeter wall.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
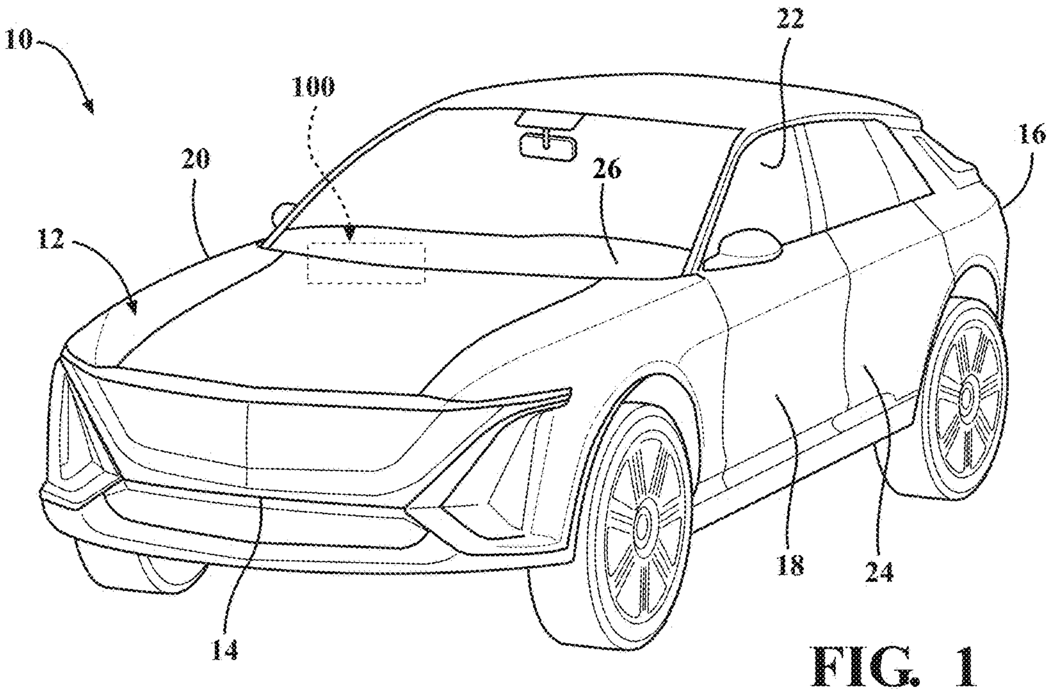
FIG. 1 is a front perspective view of a vehicle according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to FIG. 1, an illustrative example of a vehicle 10 is provided. The vehicle 10 includes a vehicle body 12 that extends fore-aft from a first or front end 14 to a second or rear end 16 and cross-car between a first or driver side 18 and a second or passenger side 20. The vehicle body 12 defines a vehicle interior 22 and a vehicle exterior 24 disposed opposite of the vehicle interior 22. An instrument panel 26 can be arranged in the vehicle interior 22 and extend cross-car between the driver side 18 and the passenger side 20. As will be discussed in greater detail below, a passenger airbag system assembly 100 can be disposed in the instrument panel 26.

Figure 2:
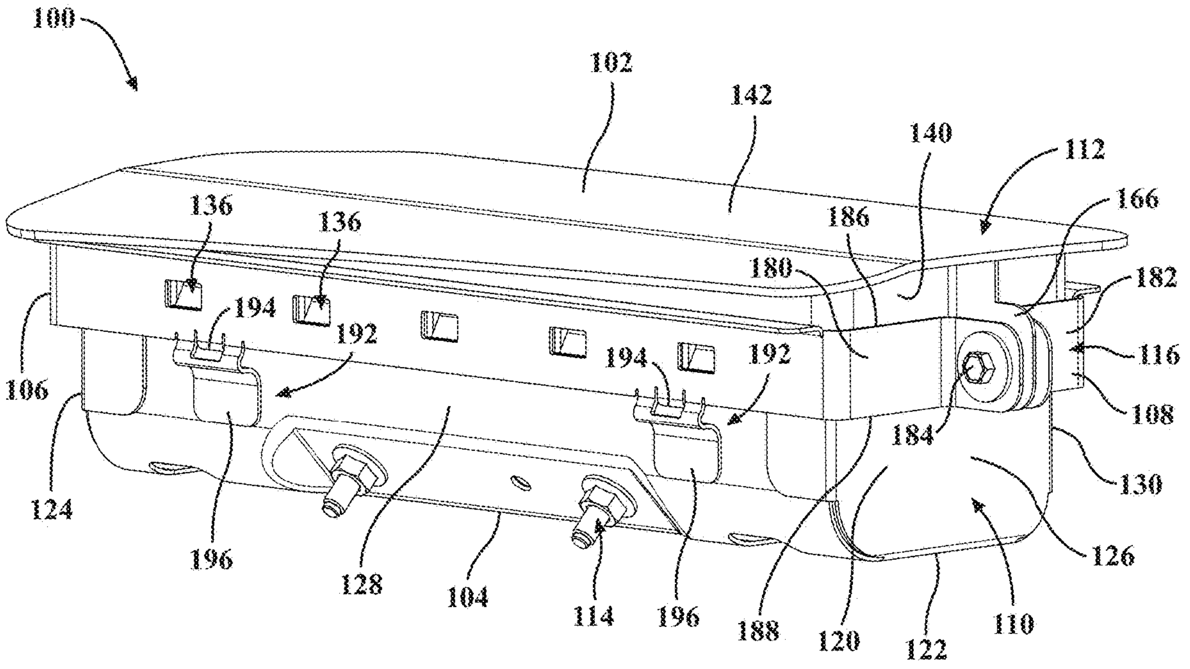
FIG. 2 is a front perspective view of a passenger airbag system assembly according to the principles of the present disclosure.

With reference to FIG. 2, the airbag system assembly 100 includes a first or front side 102, a second or rear side 104 spaced from the first side 102, a first end 106 coupling and extending between the first side 102 and the second side 104, and a second end 108 spaced from the first end 106 and coupling and extending between the first side 102 and the second side 104. In the present illustrative example, the airbag system assembly 100 includes a housing 110, an airbag chute 112 coupled to the housing 110, an airbag module 114 disposed between the housing and the chute 112, and a bracket 116.

Figure 3:
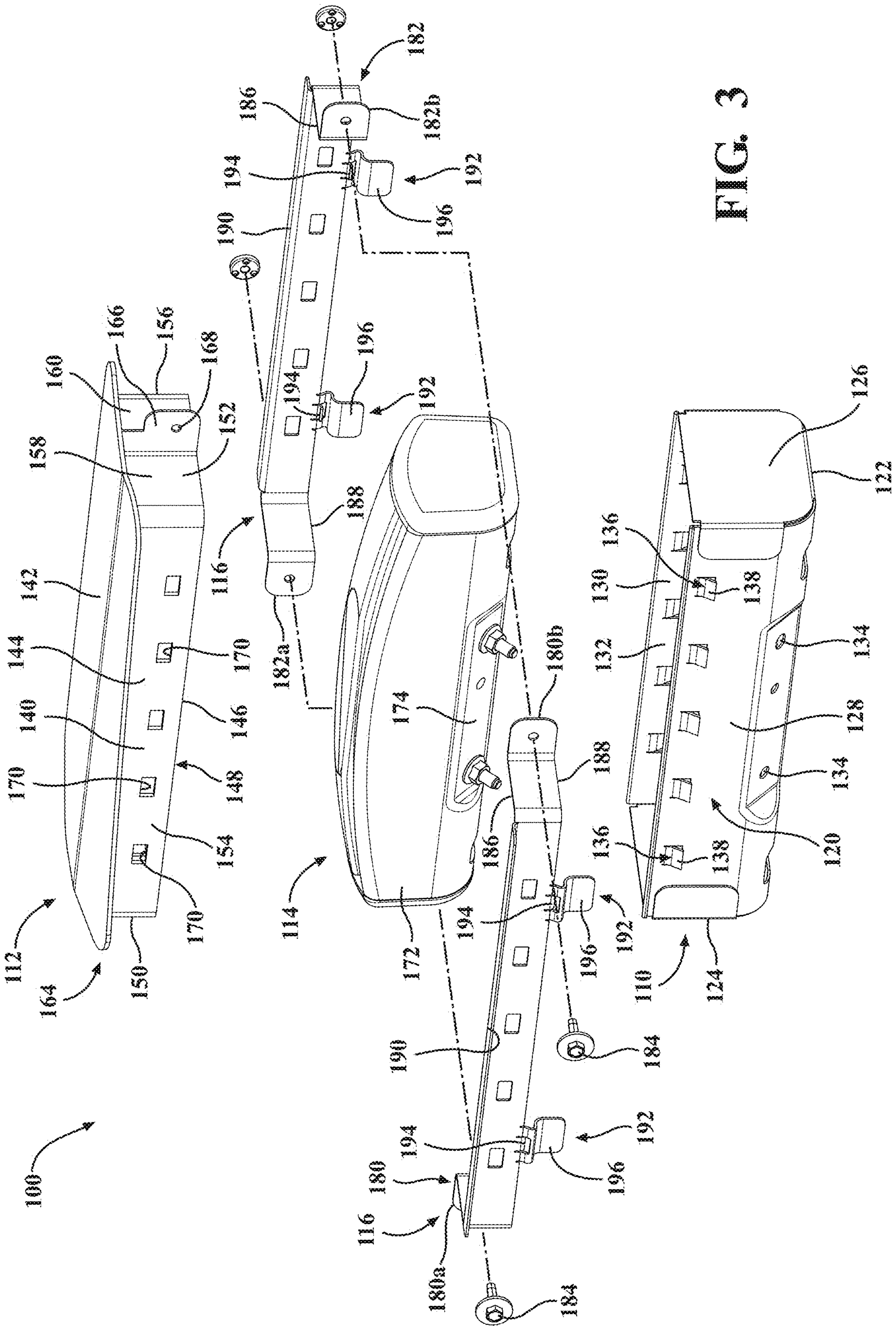
FIG. 3 is a partial exploded view of the passenger airbag system assembly of FIG. 2.

With reference to FIG. 3, an illustrative example of the housing 110 is provided. The housing 110 includes a housing perimeter wall 120 and a bottom wall 122 joined to the housing perimeter wall 120. The housing perimeter wall 120 can include a first end wall 124 defining a portion of the first end 106 of the airbag system assembly 100 and a second end wall 126 defining a portion of the second end 108 of the airbag system assembly 100. The housing perimeter wall 120 can further include a first side wall 128 extending between the first end wall 124 and the second end wall 126 and a second side wall 130 spaced from the first side wall 128 and extending between the first end wall 124 and the second end wall 126. In the present illustrative example, the bottom wall 122 extends between and joins the first and second end walls 124, 126 and the first and second side walls 128, 130. The housing perimeter wall 120 includes additional walls or can be one continuous wall that protects and provides support for the airbag module 114 during deployment, for example. In other words, the housing 110 serves to position the airbag module 114 within the vehicle 10 and facilitate proper deployment of the airbag module 114 in the event of a collision.

With continued reference to FIG. 3, the housing 110 defines a portion of a chamber 132 that is configured to receive at least a portion of the airbag module 114. According to one aspect, the housing 110 can include one or more openings or through holes 134 so that the airbag module 114 can be securely fastened to the housing 110. Additionally, the housing 110 can include one or more tabs 136 that are coupled to and extend from at least one of the first and second side walls 128, 130. The tabs 136 can be positioned on the housing 110 to correspond with aspects of the chute 112 to help secure and/or position the chute 112 with respect to the housing 110 during installation, for example. According to one aspect, the one or more tabs 136 can each include a drive-on surface 138 that is configured to be engaged by the chute 112 during installation.

With continued reference to FIG. 3, an illustrative example of the airbag chute 112 (hereinafter, referred to as the chute) is provided. The chute 112 includes a chute perimeter wall 140 extending from a cover wall 142 that defines at least a portion of the first side 102 of the airbag system assembly 100. More particularly, the chute perimeter wall 140 includes a proximal end 144 coupled to the cover wall 142 and a distal end 146 spaced from the proximal end 144 and defining an aperture 148. In the present illustrative example, the chute perimeter wall 140 includes a first end wall 150, a second end wall 152 spaced from the first end wall 150, a first side wall 154 coupled to and extending between the first end wall 150 and the second end wall 152, and a second side wall 156 coupled to and extending between the first end wall 150 and the second end wall 152. According to one aspect, the chute perimeter wall 140 can be configured to correspond with the housing perimeter wall 120 so that the housing 110 can be joined to the chute 112 to further define the chamber 132 and enclose the airbag module 114, for example. In other words, the housing perimeter wall 120 corresponds with and can be inserted into the aperture 148 of the chute perimeter wall 140. In at least one example, the chute perimeter wall 140 directly engages (i.e., contacts) more than half of the perimeter of the housing perimeter wall 120 when the chute 112 is installed on the housing 110. The engagement between the chute 112 and the housing 110 can be desirable to reduce bell mouthing during deployment of the airbag module 114, for example.

According to one aspect, at least one of the first and second end walls 150, 152 of the chute 112 can include a first segment 158 and a second segment 160 joined to the first segment 158. The first segment 158 and the second segment 160 can be at least partially separated by a slot or joint 162. As will be discussed in greater detail below, the joint 162 can be configured such that portions of the chute 112 can be compressed by the bracket 116 to secure the chute 112 to the housing 110 during installation, for example.

Figure 4:
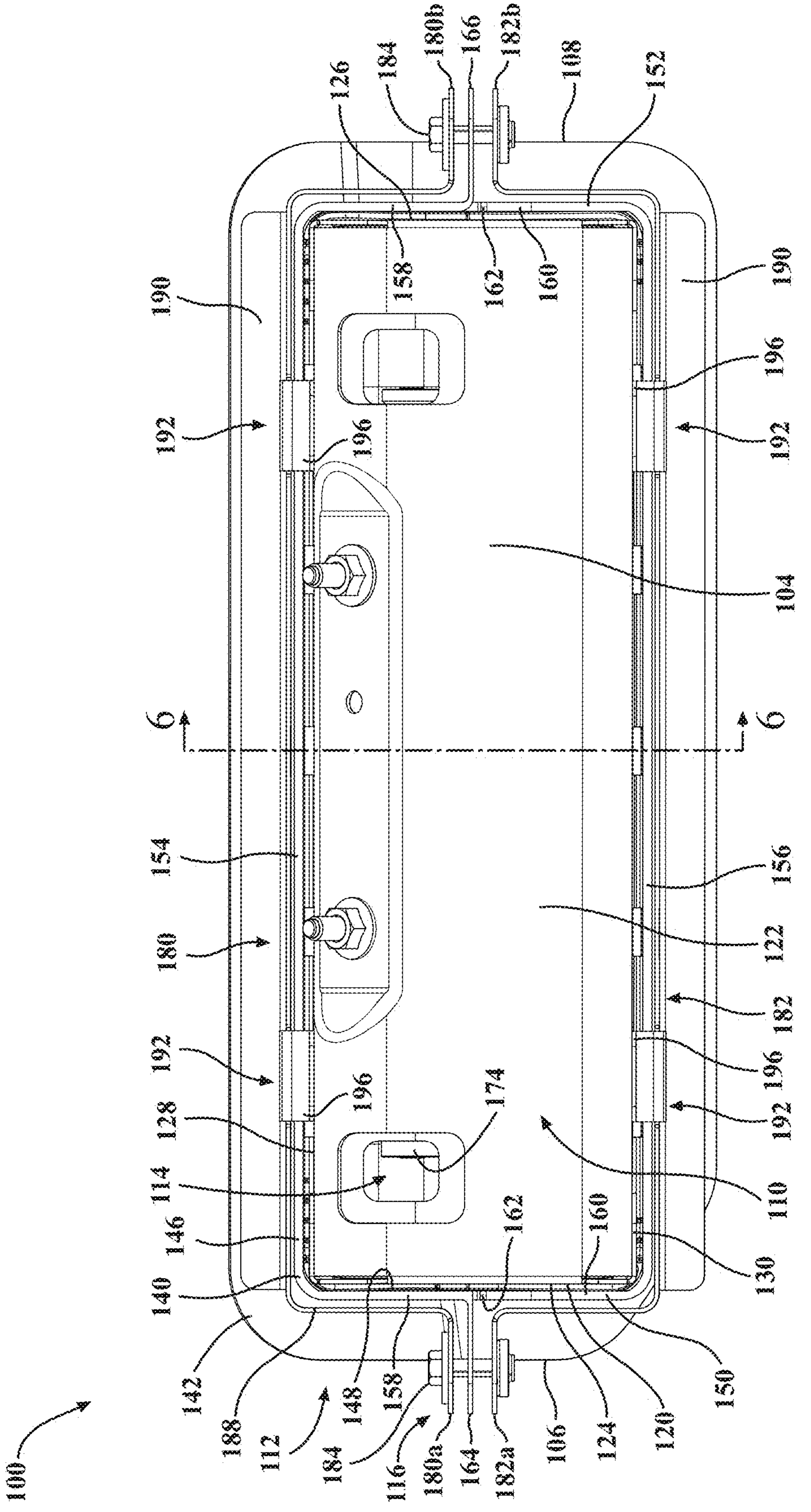
FIG. 4 is a bottom view of the passenger airbag system assembly of FIG. 2.

According to another aspect, the chute 112 can have one or more mounting flanges that extend away from the first and second end walls 150, 152. In the present illustrative example, as shown in FIGS. 3 and 4, the one or more flanges include a first mounting flange 164 coupled to and extending transverse from the first end wall 150 and a second mounting flange 166 coupled to and extending transverse from the second end wall 152. Optionally, the mounting flanges 164, 166 can be arranged adjacent to the joint 162. According to another aspect, each of the mounting flanges 164, 166 can include a through hole 168 that is configured to receive a fastener.

According to yet another aspect, the first and second side walls 154, 156 of the chute 112 can include one or more windows 170 that correspond with the tabs 136 of the housing 110. During installation, the side walls 154, 156 of the chute 112 move toward the chamber 132 until tabs 136 align with and are received by the windows 170, allowing the side walls 154, 156 of the chute to snap back (i.e., return) to their original position while still engaging a portion of the tabs 136 to secure the chute 112 to the housing 110.

Figure 6:
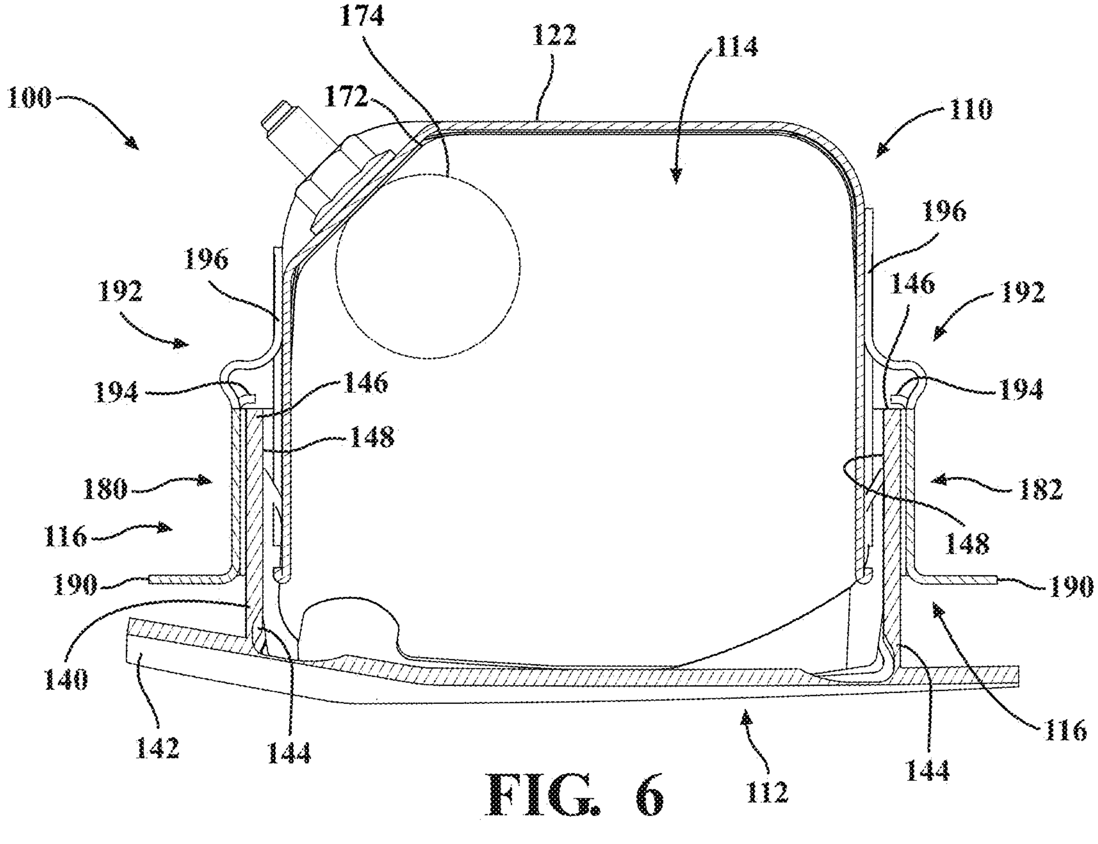
FIG. 6 is a cross-sectional view of the passenger airbag system assembly of FIG. 4 along line 6-6 of FIG. 4.

With reference to FIG. 6, an illustrative example of the airbag module 114 is provided. The airbag module 114 can include a cushion 172 and an inflator 174 disposed in the chamber 132 between the housing 110 and the chute 112. The cushion 172, typically constructed from a durable fabric such as nylon or polyester, can be configured to rapidly inflate and provide a protective barrier for vehicle occupants during a collision. The inflator 174, which may utilize a chemical propellant or compressed gas, can be configured to generate and deliver gas to the cushion 172 upon activation. The inflator 174 can be mechanically coupled to the housing 110—such as by bolts, brackets, or integrated mounting features—so that, when triggered, the gas produced by the inflator is efficiently directed into the cushion 172.

Figure 5:
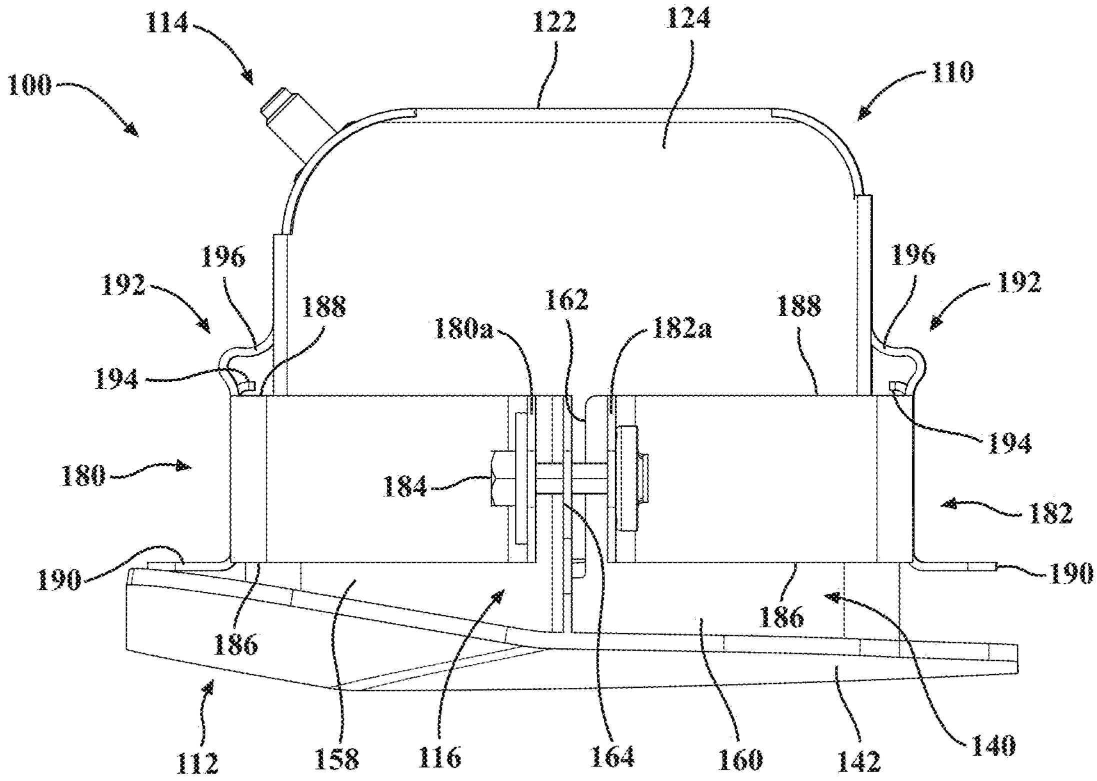
FIG. 5 is an end view of the passenger airbag system assembly of FIG. 2.

With reference to FIGS. 3-5, an illustrative example of the bracket 116 is provided. According to at least one aspect, the bracket 116 can be configured to securely fasten the chute 112 to the housing 110 and to the instrument panel 26 and, further, reinforces the housing perimeter wall 120 and the chute perimeter wall 140.

With reference to FIGS. 4 and 5, the bracket 116 can include a first half or portion 180 and a second half or portion 182 that are joined together by one or more fasteners 184. The first half 180 and the second half 182 are each configured to correspond with the chute perimeter wall 140. For instance, in the present illustrative example, each half 180, 182 includes a first end 180*a*, 182*a* corresponding with the first mounting flange 164 of the chute 112 and a second end 180*b*, 182*b* spaced from the first end 180*a*, 182*a* and corresponding with the second mounting flange 166 of the chute 112.

Each half 180, 182 includes a first or upper edge 186 extending from the first end 180*a*, 182*a* to the second end 180*b*, 182*b* and a second or lower edge 188 extending from the first end to the second end. Optionally, each half 180, 182 can include a reinforcing flange 190 extending from the upper edge 186 and between the first end 180*a*, 182*a* and the second end 180*b*, 182*b*. The reinforcing flange 190 can be desirable for increasing the strength of the bracket 116 to prevent bell mouthing of the housing 110 during deployment of the airbag module 114, for example.

According to at least one aspect, each half 180, 182 can include one or more supports 192 extending from the lower edge 188 and contacting a portion of the housing perimeter wall 120. The one or more supports 192 can include a hook 194 that is configured to engage with the distal end 146 of the chute perimeter wall 140. The hook 194 can be desirable for positioning the bracket 116 (i.e., each half 180, 182) with respect to the chute 112 and the housing 110. The supports 192 can also include arms 196 that extend toward the second side 104 of the airbag system assembly 100 and attach to the housing perimeter wall 120. The arms 196 are configured to attach the bracket 116 (i.e., each half 180, 182) to the housing 110 prior to assembly to the chute 112.

Figure 7:
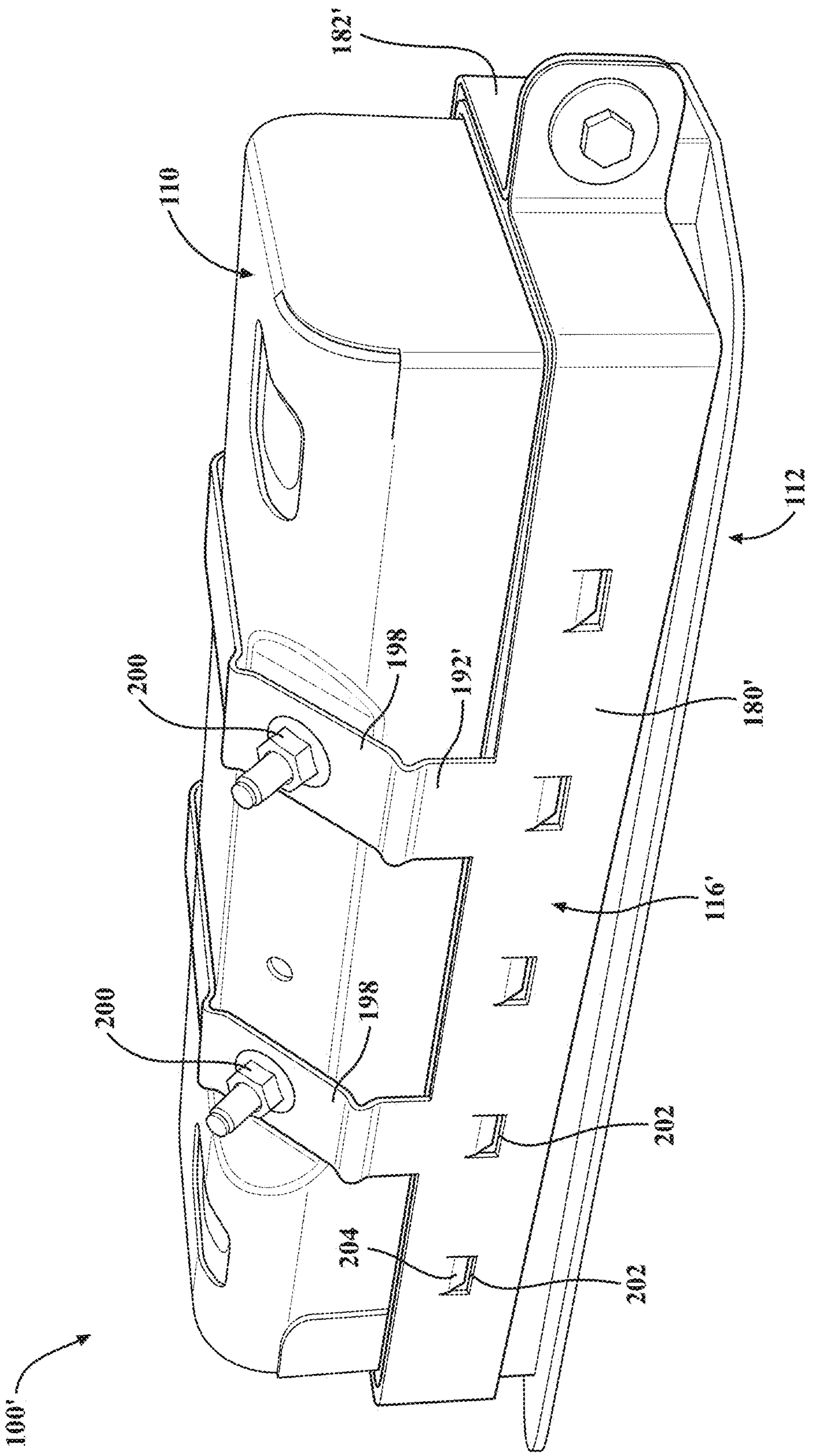
FIG. 7 is a perspective view of another configuration of an airbag system assembly according to the principles of the disclosure.

FIG. 7 illustrates another illustrative configuration of an airbag system assembly 100'. This configuration is similar in many respects to the configuration of FIGS. 1-6. Accordingly, the descriptions of the configurations are hereby incorporated into one another, and description of subject matter common to the configurations generally may not be repeated.

With reference to FIG. 7, a bracket 116' includes one or more supports 192' that have one or more bands 198 wrapping around a portion of the housing 110 and join a first half 180' and a second half 182'. The bands 198 can be secured to the housing 110 between one or more fasteners 200 and the airbag module 114. According to one aspect, the bands 198 can be desirable for supplying pressure on the housing 110 to help prevent bell mouthing of the housing 110 during deployment of the airbag module 114, for example.

In at least one example, the bracket 116' (i.e., each of the first half 180' and the second half 182') includes one or more openings 202 that correspond with the windows 170 of the chute 112. According to at least one aspect, the one or more openings 202 can include tabs 204 that correspond with the windows 170 of the chute 112 and are desirable for positioning the bracket 116' with respect to the chute 112, for example.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An airbag system assembly, comprising:
a housing including a housing perimeter wall;
an airbag chute coupled to the housing perimeter wall to define an airbag chamber between the housing and the airbag chute, the airbag chute including a chute perimeter wall that engages the housing perimeter wall and also includes a first flange extending from the chute perimeter wall and a second flange disposed on an opposite end of the airbag chute and extending from the chute perimeter wall; and
a bracket coupled to the airbag chute and including at least one fastener for securing the airbag chute to the housing, the bracket including a first half engaging the first flange and the second flange and a second half engaging the first flange and the second flange.

2. The airbag system assembly of claim 1, wherein the chute perimeter wall includes one or more windows extending through the chute perimeter wall.

3. The airbag system assembly of claim 2, wherein the housing includes one or more tabs coupled to the housing perimeter wall and disposed to correspond with the windows of the chute perimeter wall.

4. The airbag system assembly of claim 1, wherein the bracket includes one or more supports engaging the housing perimeter wall.

5. The airbag system assembly of claim 4, wherein the one or more supports include a hook engaging a distal end of the chute perimeter wall and an arm engaging the housing perimeter wall.

6. The airbag system assembly of claim 1, wherein the at least one fastener includes a first fastener coupling together the first flange, the first half, and the second half and a second fastener coupling together the second flange, the first half, and the second half.

7. The airbag system assembly of claim 1, wherein the airbag chute includes at least one joint extending through the chute perimeter wall.

8. The airbag system assembly of claim 1, wherein the airbag chute includes an end wall including a first segment and a second segment joined to the first segment.

9. The airbag system assembly of claim 8, wherein the first segment and the second segment are at least partially separated by a joint.

10. The airbag system assembly of claim 1, wherein the first half and the second half each include an upper edge extending from a respective first end to a respective second end and a reinforcing flange extending from the upper edge between the respective first end and the respective second end.

11. A vehicle, comprising:
a vehicle body, including:
a first end and a second end spaced from the first end in a fore-aft direction,
a first side and a second side spaced from the first side in a cross-car direction,
a vehicle interior, and
a vehicle exterior;
an instrument panel disposed within the vehicle interior and extending in the cross-car direction between the first side and the second side; and
an airbag system assembly coupled to the instrument panel, comprising:
a housing including a housing perimeter wall,
an airbag chute coupled to the housing perimeter wall to define an airbag chamber between the housing and the airbag chute, the airbag chute including a chute perimeter wall that engages the housing perimeter wall and a first flange extending from the chute perimeter wall and a second flange disposed on an opposite end of the airbag chute and extending from the chute perimeter wall, and
a bracket coupled to the airbag chute and including at least one fastener for securing the airbag chute to the housing, the bracket including a first half engaging the first flange and the second flange and a second half engaging the first flange and the second flange.

12. The vehicle of claim 11, wherein the chute perimeter wall includes one or more windows extending through the chute perimeter wall.

13. The vehicle of claim 12, wherein the housing includes one or more tabs coupled to the housing perimeter wall and disposed to correspond with the windows of the chute perimeter wall.

14. The vehicle of claim 11, wherein the bracket includes one or more supports engaging the housing perimeter wall.

15. The vehicle of claim 14, wherein the one or more supports include a hook engaging a distal end of the chute perimeter wall and an arm engaging the housing perimeter wall.

16. The vehicle of claim 11, wherein the at least one fastener includes a first fastener coupling together the first flange, the first half, and the second half and a second fastener coupling together the second flange, the first half, and the second half.

17. The vehicle of claim 11, wherein the airbag chute includes at least one joint extending through the chute perimeter wall.

18. The vehicle of claim 11, wherein the airbag chute includes an end wall including a first segment and a second segment joined to the first segment.

19. The vehicle of claim 18, wherein the first segment and the second segment are at least partially separated by a joint.

20. The vehicle of claim 11, wherein the first half and the second half each include an upper edge extending from a respective first end to a respective second end and a reinforcing flange extending from the upper edge between the respective first end and the respective second end.

* * * * *